April 29, 1941.  A. HUREWITZ  2,240,441
COMBINATION PLASTIC MOUNT AND PIN STEM JOINT OR CATCH
Filed June 17, 1939
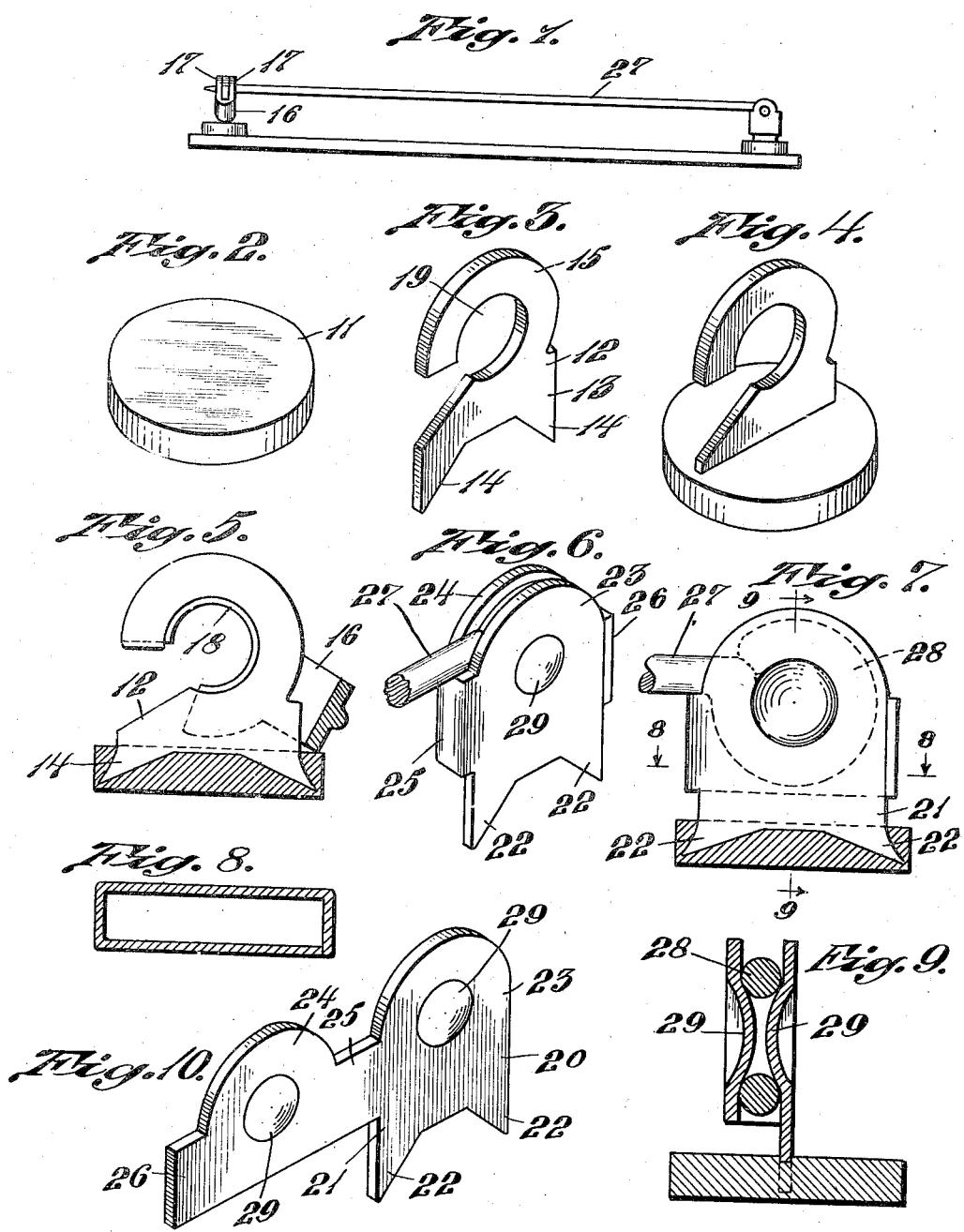
INVENTOR.
Alexander Hurewitz
BY
Barlow & Barlow
ATTORNEYS.

Patented Apr. 29, 1941

2,240,441

UNITED STATES PATENT OFFICE 2,240,441

COMBINATION PLASTIC MOUNT AND PIN STEM JOINT OR CATCH

Alexander Hurewitz, Bronx, N. Y., assignor, by mesne assignments, to A. E. Waller Company, Inc., a corporation of Rhode Island Application June 17, 1939, Serial No. 279,728

7 Claims. (Cl. 24—157)

This invention relates to a pin stem joint or catch, more particularly that type to be attached to some plastic material such as Celluloid, Gallolith, or the like and has for one of its objects to provide a pin stem joint or catch which may be made inexpensively and by tool operations ready to be attached.

Another object of the invention is to provide a pin stem joint which may be formed in automatic tools with a precision whereby the formations will have a minimum number of rejections.

Another object of the invention is to provide a combination plastic mount and pin stem joint or catch in which the body of the joint or catch will be securely fastened to the mount.

Another object of the invention is to provide the body of such device in a single piece, shaped to be suitably retained in its mount and desirably function with the movable part which it is to receive.

Another object of the invention is to provide in such a single piece body, means to suitably form a bearing for pivotally mounting the movable part to be assembled thereon.

With these and other objects in view, the invention consists of certain novel features of construction, as will be more fully described, and particularly pointed out in the appended claims.

In the accompanying drawing:

Fig. 1 is a side elevation of a bar pin equipped with a pin stem joint and a catch embodying this invention;

Fig. 2 is a perspective view of the mount or plastic member on which the catch or joint is mounted;

Fig. 3 is a perspective view of the body of the catch;

Fig. 4 is a perspective view of the body of the catch mounted on the plastic member;

Fig. 5 is a sectional view illustrating the rotary part of the catch as mounted on the body thereof and also the whole assembled upon the plastic member;

Fig. 6 is a perspective view of the pin stem joint with the fragmentary portion of the pin stem assembled therein;

Fig. 7 is a central sectional view illustrating the pin stem joint as shown in Fig. 6 as mounted upon the plastic member;

Fig. 8 is a sectional view on line 8—8 of Fig. 7 without the mount;

Fig. 9 is a sectional view on line 9—9 of Fig. 7; and

Fig. 10 is a perspective view illustrating the pin stem joint before folded into final position.

It is found in the practice of securing pin stem joints and catches to plastic parts, such as Celluloid, that it is convenient to mount the pin stem joint or catch on a plastic member apart from the plastic part or device upon which the final assembly is desired and then attach the plastic member and the part together with some sort of adhesive or cement for holding the assembly in desired relation; and in order to accomplish this in a simplified manner, I have provided a blade-like portion of the metal pin stem joint or catch with spurs and adaptable for insertion into a plastic disk member which may then later be assembled on the bar or other part of the plastic material to provide the parts in the desired relation; and the following is a more detailed description of the present embodiment of this invention, illustrating the preferred means by which these advantageous results may be accomplished:

With reference to the drawing, 11 is the plastic member or mount, preferably a disk of Celluloid; 12 is the body of a catch which is formed of a single piece of sheet stock having a blade 13 terminating in prongs 14 for insertion into the plastic member 11 as illustrated in Figs. 4 and 5. The prongs or spurs 14 being spread as the insertion takes place so as to anchor the body 12 against withdrawal from the plastic member or mount. Heat may be applied and suitable supporting pressure to the under surface of the disk for the accomplishment of this assembly. The upper part 15 of the body is in the case of the catch, formed in some suitable shape such, for instance, as a hook as illustrated in Figs. 3, 4 and 5 and the rotor member 16 has its opposite ears 17 extend along opposite sides of the hook 15 with portions 18 turned inwardly into the opening 19 which forms a bearing for the rotation of this member 16 on the body.

In the case of the pin stem joint, this joint is cut out of sheet stock as shown in Fig. 10; the body is designated 20 and there is a blade 21 terminating in spurs or prongs 22 which may be inserted into a Celluloid disk member 11, as shown in Fig. 7 where the spurs or prongs are spread apart in the same manner as shown in the assembly of the catch and Celluloid disk of Figs. 4 and 5 to suitably anchor the assembly together. The body of the joint, however 20 provides an ear 23 and an ear 24 connected by a web 25 and also bridging the space between the two ears 23 and 24 there is a closure tongue 26, both of which parts 25 and 26 limit the pin stem 27 which is pivotally mounted by reason of the loop portion 28 of the pin and indentations 29 on either ear to extend into the loop for providing a pivotal mounting of the pin stem in the body. The web 25 in its position as shown at Fig. 6 limits the pivotal movement of the pin stem so that some spring in the pin stem 27 is necessary in order that it may engage the hook of the catch for holding the parts in position.

The foregoing description is directed solely toward the construction illustrated, but I desire it to be understood that I reserve the privilege of resorting to all the mechanical changes to which the device is susceptible, the invention being defined and limited only by the terms of the appended claims.

I claim:

1. A finding for a pin stem comprising a body part having a portion adapted to engage and assist in retaining in position a pin stem, said body being of flat sheet stock in substantially a single plane and provided at its lower end with projecting spurs in the same plane adapted for insertion into plastic material for anchoring the finding thereto.

2. A finding for a pin stem comprising a body part having a portion adapted to engage and assist in retaining in position a pin stem, said body being of flat sheet stock in substantially a single plane and provided at its lower end with projecting spurs in the same plane adapted for insertion into plastic material for anchoring the finding thereto, and a mounting member of plastic material in which said anchoring spurs are embedded.

3. A finding for a pin stem joint comprising a body formed of a single piece of material having a side wall provided with anchoring spurs, an end wall extending at substantially right angles to the side wall, an opposite side wall extending from the end wall substantially parallel to the first side wall and an opposite end wall extending from one side wall toward the other.

4. A finding for a pin stem joint comprising a body formed of a single piece of material having a side wall provided with anchoring spurs extending downwardly therefrom and in substantially the same plane therewith, an end wall extending at substantially right angles to the side wall, an opposite side wall extending from the end wall and substantially parallel to the first side wall, and an opposite end wall extending from one side wall toward and meeting the other said side wall.

5. A finding for a pin stem joint comprising a body formed of a single piece of material having a side wall provided with anchoring spurs, an end wall extending at substantially right angles to the side wall, an opposite side wall extending from the end wall and substantially parallel to the first side wall and an opposite end wall extending from one side wall toward the other, and a mounting member of plastic material in which said anchoring spurs are embedded.

6. A finding for a pin stem comprising a body part having a hook-shaped portion adapted to engage and assist in retaining in position a pin stem, a rotary keeper on said body for closing the entrance to said hook, said body being of flat sheet stock in substantially a single plane and provided at its lower end with projecting spurs in the same plane adapted for insertion into plastic material for anchoring the finding thereto.

7. A finding for a pin stem comprising a body part having a hook-shaped portion adapted to engage and assist in retaining in position a pin stem, a rotary keeper on said body for closing the entrance to said hook, said body being of flat sheet stock in substantially a single plane and provided at its lower end with projecting spurs in the same plane adapted for insertion into plastic material for anchoring the finding thereto, and a mounting member of plastic material in which said anchoring spurs are embedded.

ALEXANDER HUREWITZ.